United States Patent [19]

Blahak et al.

[11] 4,312,672

[45] Jan. 26, 1982

[54] RELEASE AGENT FOR REMOVING PLASTICS, ESPECIALLY POLYURETHANE PLASTICS FROM MOLDS

[75] Inventors: Johannes Blahak, Gauting-Buchendorf; Hermann Menk, Bodolz, both of Fed. Rep. of Germany

[73] Assignee: Metzeler Kautschuk GmbH, Munich, Fed. Rep. of Germany

[21] Appl. No.: 142,754

[22] Filed: Apr. 22, 1980

[30] Foreign Application Priority Data

Apr. 25, 1979 [DE] Fed. Rep. of Germany ....... 2916700

[51] Int. Cl.³ ............................ B28B 7/36; B29C 1/04
[52] U.S. Cl. ........................... 106/38.22; 252/52 A; 252/56 S; 264/338
[58] Field of Search .............. 264/46.6, 54, 338, ; 252/56 S; 106/38, 22, 24; 252/52 A

[56] References Cited

U.S. PATENT DOCUMENTS

| | | | |
|---|---|---|---|
| 3,189,629 | 6/1965 | Huttenlocher et al. | 252/56 S X |
| 3,468,991 | 9/1969 | Krug | 264/54 X |
| 3,487,134 | 12/1969 | Burr | 264/46.6 |
| 3,694,530 | 9/1972 | Wolfe | 264/54 X |
| 3,875,069 | 4/1975 | Worschech et al. | 252/56 S |
| 4,038,088 | 7/1977 | White et al. | 264/48 X |
| 4,209,564 | 6/1980 | Nomura et al. | 264/46.6 X |
| 4,217,394 | 8/1980 | Newkirk et al. | 252/52 A |

FOREIGN PATENT DOCUMENTS 1131873  6/1962  Fed. Rep. of Germany .

OTHER PUBLICATIONS

Hackh's Chemical Dictionary, 4th Edition, p. 665.

*Primary Examiner*—Philip Anderson
*Attorney, Agent, or Firm*—Herbert L. Lerner; Laurence A. Greenberg

[57] ABSTRACT

A release agent applied to the surface of a mold in the form of a film to permit ready removal of plastic, particularly polyurethane, from the mold. The release agent contains a film-forming substance having an affinity to the plastic and becomes attached to the plastic and is removed with the plastic when taken out of the mold thereby preventing buildup of film-forming substance in the mold. A cross-linking agent and/or a cross-linking catalyst and/or emulsifier and/or tenside may advantageously be incorporated in the release agent.

9 Claims, No Drawings that the production interruptions heretofore required in such cases for removing these undesirable release agent films become now largely unnecessary.

RELEASE AGENT FOR REMOVING PLASTICS, ESPECIALLY POLYURETHANE PLASTICS FROM MOLDS

BACKGROUND OF THE INVENTION

1. Field of the Invention

The invention relates to a release agent for removing plastics, especially polyurethane plastics from a mold. The release agent is applied to the surface of a mold in the form of a film.

2. Description of the Prior Art

As is well known, plastics are removed from closed or open molds through the use of release agents, for instance, such as tetrafluoroethylene (Teflon ®), silicon or wax type, the latter often being dissolved in solvents. The release agents used up-to-date have the disadvantage that they must be removed completely from the mold after the molded part has been removed from the latter, since otherwise it is not possible to varnish the plastic surface of the molded part in the desired manner and with the necessary adhesion. This operation of removing the release agent film adhering to the surface of the plastic is very laborious and comprises vapor degreasing and post-treatment with solvent, which result in changes of the plastic surface which necessitates in turn post-treatments such as puttying and priming, which overall leads to a considerable cost increase of the finished part. On the other hand, due to the low affinity of the release agents used heretofore vis-a-vis the plastic, particularly polyurethane or polyurea plastic, a film of release agent always remains in the mold itself after the molded part is removed. The thickness of this film grows with continuous production and must be removed from time to time, thereby interrupting the production cycle. For health reasons the use of solvents which are required for the release agents known heretofore and which furthermore lengthens the cycle time of mold removal is objectionable because the solvent must evaporate after the application, so that one must frequently operate with multi-station rotary table in the production process.

SUMMARY OF THE INVENTION

It is therefore an object of the invention to provide a method and an improved release agent for removing plastics, particularly polyurethane plastics, from molds, in which the described disadvantages are absent.

In particular the release agent can be used without a solvent. The invention permits the molded parts to be varnished immediately after removal from the mold and without additional pretreatment measures.

With the foregoing and other objects in view, there is provided in accordance with the invention a process of casting plastics in a mold in which a release agent is applied to the surface of the mold in the form of a film to permit ready removal of the cast plastic from the mold, the improvement comprising applying a release agent containing a film-forming substance having an affinity to the polymer matrix and becomes attached to the plastic, removing the plastic together with said film-forming substance attached thereto from the mold thereby preventing buildup of film forming substances in the mold.

In accordance with the invention there is provided a release agent for application to the surface of a mold in the form of a film to permit ready removal of plastic from the mold which comprises a liquid containing a film-forming substance having an affinity to the plastic matrix and which upon application to the surface of the mold forms a film, and due to the affinity of said substance to the plastic becomes attached to the plastic and is removed with the plastic when taken out of the mold thereby preventing buildup of film-forming substance in the mold.

Other features which are considered as characteristic for the invention are set forth in the appended claims.

Although the invention is illustrated and described herein as embodied in a release agent for removing plastics, especially polyurethane plastics from molds; it is nevertheless not intended to be limited to the details shown, since various modifications may be made therein without departing from the spirit of the invention and within the scope and range of equivalents of the claims.

The invention, however, together with additional objects and advantages thereof will be best understood from the following description.

DETAILED DESCRIPTION OF THE INVENTION

In accordance with the invention, a release agent for removing plastics, especially polyurethane plastics, from molds which is applied in the form of a film to the surface of the closed or open mold, is characterized by the feature that the release agent film has been prepared from, or consists of, at least one film-forming substance which has affinity to the polymer matrix and preferably has few, or non-reactive, end groups. Optionally the film-forming substance may be in a mixture with a cross-linking agent reactive with building blocks of the plastic to be removed from the mold and/or at least one catalyst for the cross-linking reaction.

The release agent according to the invention can be prepared by simple mixing of release agent film formers as well as, optionally, cross-linking agents and/or catalysts and can be sprayed, brushed or applied in some other manner to the mold in the form of a film. If required, a tenside can be added to the release agent for improving the wetting of the mold surface. If desired, an emulsifier can also be added to the release agent to increase the rate of diffusion of the release agent molecule and/or for subsequently diffusing the release agent film into the surface of the plastic to be removed from the mold. The release agent according to the invention may be employed in the form of a homogeneous solution which may optionally also contain one or several inorganic or organic solvents.

With the release agent according to the invention it is possible in a technically simple, economical and effective manner to remove plastics, especially polyurethane plastics, from molds without problems and without the need for complicated and expensive rework of the surface of the plastic removed from the mold, i.e. the molded plastic part removed from the mold can be subjected to any desired surface treatment, especially to immediate varnishing without the need for additional prior treatments. If the release agent according to the invention is used, no or only very small amounts of release agent film remain on the surface of the mold after the plastic has been removed from the mold, so From a release agent film wetting the surface of the mold, the reactive substances (cross-linking) contained therein, catalyzed or not catalyzed, and/or catalysts themselves which may be contained therein counterdiffuse with respect to the reactive building blocks such as polyisocyanates, of the plastic to be removed from the mold in a controlled manner by means of the concentration in the release agent film. This prevents, through chemical reaction, a reaction of the reactive substances at the mold surface or adsorption of the active reaction products such as polyurethane or polyurea groups thereon. In this manner, reactive groups such as hydroxyl or amino end groups are placed on the plastic surface in a definite manner, which make varnishing on top of these reactive groups possible without first removing the release agent film. Due to the affinity to the polymer matrix, the release agent film itself diffuses into the polymer after removal from the mold wherein the polymer was held during the foaming and setting process, because of the little or non-reactivity of its end groups.

The release agent according to the invention is preferably used without dilution with solvents. However, it can also be used dissolved in organic or inorganic solvents and/or propellants in order to make it more easily sprayable. Especially well suited for this are chlorinated or fluorinated hydrocarbons, carboxylic acid esters and ketones, to which optionally water can also be added.

Examples for film formers or film forming substances usable according to the invention are polyols, polyethers and/or polyesters preferably such with secondary end groups and molecular weight (average by weight) of 100 to 20,000 especially from 800 to 5,000 and their nonfunctional reaction products (zerols), which for example are blocked by monofunctional isocyanates.

Suitable as film-forming substances are also polyamines with sterically inhibited amino groups or their nonfunctional acyl compounds. However, esters of stearic and oleic acid can also be used with low molecular polyols.

The suitability of the film-forming substances usable according to the invention is first tested by spraying a film, which has little reactivity with isocyanates, onto the mold surface. Zerewitinoff-active compounds are very reactive with isocyanates. Compounds which have only a small fraction of the reactivity of Zerewitinoff-active compounds are considered of little reactivity with isocyanates. If the film is only formed partially, the coverage can be perfected by the addition of tensides for lowering the surface tension. According to a preferred embodiment, a polyol with little reactivity which exhibits affinity vis-a-vis the polyol or polyamine contained in the plastic to be removed from the mold, is used for the preparation of a release agent film. This will facilitate diffusion of the release agent film into the molded body to be removed from the mold.

As cross-linking agents which diffuse in a controlled manner from the release agent film and intercept reactive molecules, such as polyisocyanates, and thus prevent them from reacting at the mold surface, there can be used, for example: all Zerewitinoff-active compounds, preferably amines, polyamines, alcohols, polyols, water, amino-alcohols, aminopolyols. Especially suitable are alkylene glycol, butane diol, hexane diol, ethylene diamine, 1,6-hexamethylene diamine, aromatic polyamines, for instance, tolamine and the nuclear alkylation products thereof as well as 4-methyl-3,5-diaminobenzoic-acid ester. Suitable as cross-linking agents are also any compounds which are considered as aging protection agents for polyurethane systems, especially carbo diiamides and sterically inhibited phenols as such, preferably the reactive groups.

The intercept reaction of the polyisocyanates in the release agent film which is important for the removal from the mold, may be aided by catalysts of the OH-/NCO or the $NH_2$/NCO reaction. Thus, diffusion of NCO groups toward the mold surface or urethane and urea groups with adhesive effect at the mold surface is reliably avoided. Examples for catalysts which can be used according to the invention for aiding the intercept reaction in the release agent film or can be used as such, are tin compounds, especially dibutyl tin dilaurate and/or tin (II) octoate, tertiary amines, preferably Dabco ® (triethylene-diamine), and caprolactam/water mixtures. Further examples which can be used in a mixture with the cross-linking agents and the above-mentioned catalysts or alone in the release agent film at the mold surface, are trimerization catalysts, especially ammonium acetate, sodium acetate and potassium acetate, and carbodiimidization catalysts, especially phospholin oxide.

The special advantage of the release agent according to the invention, besides the ease of removal from the mold attainable thereby and its usability without solvents, is that it is possible thereby to functionalize the surface of the molded part definitely and stoichiometrically via the concentration of the cross-linking agent and/or catalysts in the release agent and diffusion film. Since, with the proper affine choice, the release agent film remains diffused into the molded plastic part, it is possible as a result of the OH- or $NH_2$ groups formed at the surface, to perform a varnishing operation directly without further pretreatment, preferably using DD varnishes, with excellent adhesion of the varnish without the necessity of removing the release agent film.

The release agent according to the invention contains the cross-linking agent preferably in an amount of 0 to 50%, and especially, 3 to 15%. By using certain polyether film formers (for instance, Desmophen ® 3600), it is possible to operate without a cross-linking agent. To improve the release action it is advisable, however, also in this case to use a cross-linking agent. Particularly good results are obtained if polypropylene glycol MG 2000, F-2, which has been reacted with 2 mol phenylisocyanate, is used as the sole component of the release agent, or also if polypropylene glycol MG 4000 is used as the film-forming substance in a mixture with 5% 1,12-diaminododecane, or if polypropylene glycol MG 2000, F-2, which has been reacted with 2 mol phenylisocyanate, is used as the film-forming substance in a mixture with 5% butane diol -1,4 as the cross-linking agent, and dibutyl tin dilaurate. Triethylene diamine (Dabco ®) or 5% ammonium acetate or 3% phosphine oxide or 5% caprolactam in a mixture with water in the volume ratio 4:1 can also be used as catalysts.

The production of polyurethanes is well known. The principal reactants are commonly a polyisocyanate and a polyol, the latter usually a polyether or a polyester. Various other constituents may be incorporated such as catalyst to facilitate the reaction, cross-linking agents, blowing agents to induce foaming, coloring agents, etc. To avoid the necessity of users, particularly smaller users, of formulating their own mixtures, manufacturers sell a polyurethane foam system, in which all the ingredients are properly mixed, usually as two liquids, which merely require pouring together to form a polyurethane foam.

The invention will be explained in further detail by the following examples without being limited thereto, however.

EXAMPLE 1

To an aluminum mold was applied a film of release agent which was prepared from a mixture of 100 parts by weight polypropylene-oxide diol with an average molecular weight of 2,000, 5 parts by weight butane diol -1,4 and 0.25 parts by weight dibutyl tin dilaurate. Onto the release agent film, a polyurethane foam system made by Bayer AG (PU 1777 HT/Desmodur PF-100 T: 52T) was poured. The molded part so obtained could be removed from the mold easily after the molding operation, and was easy to varnish; the applied varnish coating adhered firmly thereto.

REFERENCE EXAMPLE A

For comparison, the same operation was performed without using a mold release agent. The result was that the molded body stuck irreversibly to the aluminum mold.

REFERENCE EXAMPLE B

Using the known mold release agent Akmosil-180 ST ® or Baysilan Release Agent V ®, the molded body could be removed from the mold as easily as when the release agent according to the invention was used. Before this molded body could be varnished durably, however, the film of release agent adhering to the surface of the molded body had to be removed in several operations.

EXAMPLE 2

The procedure was as described in Example 1; however, 5 parts by weight 1,6-hexamethylene diamine was used as the cross-linking agent in the release system. The effects are the same as in Example 1.

EXAMPLE 3

The procedure is the same as described in Example 1; however, 15 parts by weight 1,12 duodecamethylene diamine is used as the cross-linking agent in the release system. Again good release action is obtained with at the same time good direct varnishing of the molded body.

EXAMPLE 4

The procedure is as in Example 1; however, 5 parts by weight 4-methyl-3, 5-diamino-benzoic-acid 2-ethyl-vinyl ester is used as the cross-linking agent in the release system, and as catalyst, 0.25 parts by weight dibutyl ester of phosphoric acid. Release and varnishability are excellent.

EXAMPLE 5

The procedure is as described in Example 4; however, 10 parts by weight bisethyl-2, 4-toluylene diamine are used as the cross-linking agent in the release system. The release action and the varnishability are excellent.

EXAMPLE 6

The mold is wiped with an adduct of 1 mol polypropylene oxide diol ($\overline{M}=2,000$) and 2 mol stearyl-isocyanate. The system described in Example 1 was used as the PU system. The release action and varnishability are good.

EXAMPLE 7

The procedure is as described in Example 6; however, 5 parts by weight bisethyl-2, 4-toluylene diamine are used per 100 parts by weight of the polyether with non functional groups (zerol). The release action and the varnishability are very good.

EXAMPLE 8

The procedure is as described in Examples 6 and 7; however 0.5 parts by weight dibutyl ester of phosphoric acid are added to the release system. The release action and the direct varnishability, recognizable from the ease of removal from a closed mold held at 50° C. and the good adhesion of DD ® varnish with heavy curvature of the molded part and in the drum rotation test, are excellent.

There are claimed:

1. A mold release agent for molds especially aluminum molds for the production of elastomer bodies from a reaction mixture containing an organic polyisocyanate and a reactive hydrogen-containing material, which comprises a liquid containing a film-forming substance having end groups selected from the group consisting of hydroxyl and amino end groups, which liquid, upon the application to the surface of the mold, forms a film containing a member selected from the group consisting of polyethers and polyesters with a molecular weight (average by weight) in the range of 800 to 5,000, said end groups being insufficient in activity and number to cause strong adhesion of the elastomer to the mold and prevent removal of the elastomer from the mold.

2. Release agent according to claim 1, wherein the film contains 0 to 50% of a member selected from the group consisting of a low-molecular polyol, polyamine and amino-alcohol.

3. Release agent according to claim 1 or claim 2, wherein said polyether and polyester have few reactive end groups, said end groups being secondary OH-groups.

4. Release agent according to claim 1 or claim 2, wherein said polyether and polyester have few reactive end groups, said end groups being sterically hindered amino groups.

5. Release agent according to claim 1 or claim 2, wherein said polyether and polyester have end groups reacted with another compound to produce non-functional end groups.

6. Release agent according to claim 1 or claim 2, wherein the release agent is a reaction product produced by reacting polypropyleneglycol having a molecular weight (average by weight) of about 2,000 with phenylisocyanate.

7. Release agent according to claim 1 or claim 2, wherein the release agent is a mixture of polypropyleneglycol with a molecular weight (average by weight) of about 4,000 with 5% 1,12-diaminododecane.

8. Release agent according to claim 1 or claim 2, wherein the release agent is polypropyleneglycol with a molecular weight (average by weight) of about 3,600 reacted with phenylisocyanate in admixture with about 5% butane-1.4-diol, and dibutyl tin dilaurate.

9. Release agent according to claim 1 or claim 2, wherein the release agent prior to being applied to the surface of the mold contains a solvent selected from the group consisting of chlorinated hydrocarbons, esters of carboxylic acids and ketones, and if desired, in a mixture with water.

* * * * *